US012763651B2

(12) United States Patent
Simonin et al.

(10) Patent No.: US 12,763,651 B2
(45) Date of Patent: *Oct. 13, 2026

(54) GROUNDING BRUSH ASSEMBLY

(71) Applicant: AKTIEBOLAGET SKF, Gothenburg (SE)

(72) Inventors: Anthony Simonin, Tours (FR); Emmanuel Benevise, Monts (FR); Thomas Perrotin, Saint Roch (FR); Bruno Constant, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 161 days.

This patent is subject to a terminal disclaimer.

(21) Appl. No.: 18/809,517

(22) Filed: Aug. 20, 2024

(65) Prior Publication Data

US 2025/0079951 A1 Mar. 6, 2025

(30) Foreign Application Priority Data

Aug. 30, 2023 (FR) ....................................... 2309085

(51) Int. Cl.
*H02K 11/40* (2016.01)
*H02K 13/10* (2006.01)

(52) U.S. Cl.
CPC ............. *H02K 11/40* (2016.01); *H02K 13/10* (2013.01)

(58) Field of Classification Search
CPC ................................ H02K 11/40; H02K 13/10
See application file for complete search history.

(56) References Cited

U.S. PATENT DOCUMENTS 11,486,445 B2 11/2022 Berruet et al.
2016/0111941 A1 4/2016 Sturm et al.
2017/0108047 A1 4/2017 White et al.
2021/0021180 A1 1/2021 Hubert et al.
(Continued)

FOREIGN PATENT DOCUMENTS

CN 116598858 A 8/2023
DE 102019207241 A1 11/2020
(Continued)

OTHER PUBLICATIONS

Unpublished U.S. Appl. No. 18/809,475, first named inventor: Anthony Simonin, filed Aug. 20, 2024.
(Continued)

*Primary Examiner* — Sean Gugger
(74) *Attorney, Agent, or Firm* — J-TEK LAW PLLC; Scott T. Wakeman; Mark A. Ussai

(57) ABSTRACT

A grounding brush assembly includes a grounding brush, which is provided with a plurality of conductive fibers and with a support inside of which the conductive fibers are mounted, and a brush mounting plate which is secured to the support of the brush. The mounting plate includes a radial portion and at least one centering portion extending at least axially from the radial portion, which is offset radially outwardly with respect to the support and has an outer surface defining the outside diameter of the mounting plate. The mounting plate further includes at least one spacer portion extending obliquely inwardly from the centering portion and on the side opposite the radial portion.

8 Claims, 6 Drawing Sheets

(56) References Cited

U.S. PATENT DOCUMENTS

| | | | | |
|---|---|---|---|---|
| 2021/0310517 | A1 | 10/2021 | Berruet et al. | |
| 2021/0364040 | A1* | 11/2021 | Arnault | F16C 41/002 |
| 2022/0294319 | A1 | 9/2022 | Arnault et al. | |
| 2023/0261555 | A1* | 8/2023 | Arnault | F16C 41/002 310/71 |

FOREIGN PATENT DOCUMENTS

| | | | |
|---|---|---|---|
| DE | 102021114965 | A1 | 12/2022 |
| FR | 3110650 | A1 | 11/2021 |
| FR | 3120754 | A1 | 9/2022 |
| FR | 3132806 | A1 | 8/2023 |
| KR | 102444892 | B1 | 9/2022 |

OTHER PUBLICATIONS

Unpublished U.S. Appl. No. 18/809,487, first named inventor: Anthony Simonin, filed Aug. 20, 2024.

Unpublished U.S. Appl. No. 18/809,494, first named inventor: Anthony Simonin, filed Aug. 20, 2024.

* cited by examiner

GROUNDING BRUSH ASSEMBLY

CROSS-REFERENCE

This application claims priority to French patent application no. 2309085 filed on Aug. 30, 2023, the contents of which are fully incorporated herein by reference.

BACKGROUND OF THE INVENTION

The present invention relates to the field of grounding devices for controlling the shaft current generated in electric motors or machines, and in particular grounding brush assemblies.

In an electric motor or machine, at least one rolling bearing is mounted between the housing of the electric motor or machine and the rotary shaft so as to support this shaft.

In operation, as the shaft rotates, an electrical potential difference can appear between the shaft and the housing of the electric motor or machine, which produces an electric current between the inner race of the rolling bearing, which is secured to the shaft, and the outer race secured to the housing.

The electric current passing through the components of the rolling bearing can damage these components, in particular the rolling elements and the raceways formed on the inner and outer races. Electrical discharges can also generate vibrations.

In order to remedy these drawbacks, it is known practice to earth or ground the rotary shaft by using a grounding brush comprising conductive fibers. The grounding brush is generally mounted in the bore of the housing of the electric motor in such a way that the free ends of the fibers are in radial contact with the outer surface of the rotary shaft.

By virtue of the conductivity of the fibers, the brush is kept at the same electrical potential as the housing of the electric motor. The inner and outer races of the rolling bearing are also at the same electrical potential, which reduces or even eliminates problematic electrical discharges through the rolling bearing.

For further detail regarding the design of such a grounding brush assembly, reference may be made, for example, to US Patent Publication No. 2021/0021180 A1, which describes an assembly comprising a grounding brush provided with a plurality of conductive fibers, a support inside which the conductive fibers are mounted, and an annular mounting plate comprising a plurality of tongues for the radial and axial retention of the support and an annular outer flange radially surrounding the brush and the tongues.

Depending on the relative axial positions of the grounding brush assembly and the bearing, there may be contact, during the operation of the electric machine, between the conductive fibers of the assembly on the one hand, and the rolling elements and/or the inner race of the bearing on the other hand. This contact may damage the bearing.

SUMMARY OF THE INVENTION

The present invention aims to remedy the drawback described above and relates to a grounding brush assembly comprising a grounding brush provided with a plurality of conductive fibers and with a support inside which the conductive fibers are mounted. The assembly also comprises a brush mounting plate which is secured to the support of the brush.

The mounting plate comprises a radial portion and at least one centering portion extending the radial portion at least axially, which is offset radially outwardly with respect to the support and has an outer surface defining the outside diameter of the mounting plate.

According to a general feature, the mounting plate further comprises at least one spacer portion extending obliquely inwardly from the centering portion and on the side opposite the radial portion.

With this design, the risk of contact between the conductive fibers of the assembly and the bearing is limited. To be specific, the spacer portion of the mounting plate makes it possible to establish and keep an axial space between the brush and the bearing or the housing.

The mounting plate may comprise a plurality of retention tongues for the retention of the support of the brush, extending from the radial portion, the centering portion being offset radially outwardly with respect to the retention tongues.

Preferably, the spacer portion of the mounting plate is offset axially on the side opposite the radial portion with respect to the retention tongues. The risk of contact between the conductive fibers and the bearing is thus further limited.

According to a design, the mounting plate may comprise a plurality of centering portions spaced apart in the circumferential direction, and a plurality of spacer portions extending obliquely inwardly each from one of the centering portions.

According to an alternative design, the mounting plate may have an annular centering portion. In this case, the mounting plate may include only a single spacer portion, or else a plurality of spacer portions spaced apart from one another in the circumferential direction.

The brush may be mounted axially against the radial portion of the mounting plate. Alternatively, the brush may be mounted axially against another radial portion of the mounting plate.

The mounting plate may be made as a single piece.

The invention further relates to an electric motor comprising a housing, a shaft, at least one bearing is mounted radially between the housing and the shaft, and at least one grounding brush assembly as defined hereinabove and mounted radially between the housing and the shaft, the conductive fibers of the brush of the assembly being in contact with the shaft. The spacer portion(s) of the mounting plate is/are situated axially on the side of the bearing.

BRIEF DESCRIPTION OF THE SEVERAL VIEWS OF THE DRAWINGS

The present invention will be better understood on studying the detailed description of an embodiment, given by way of non-limiting example and illustrated by the appended drawings, in which.

DETAILED DESCRIPTION OF THE INVENTION

Figure 1:
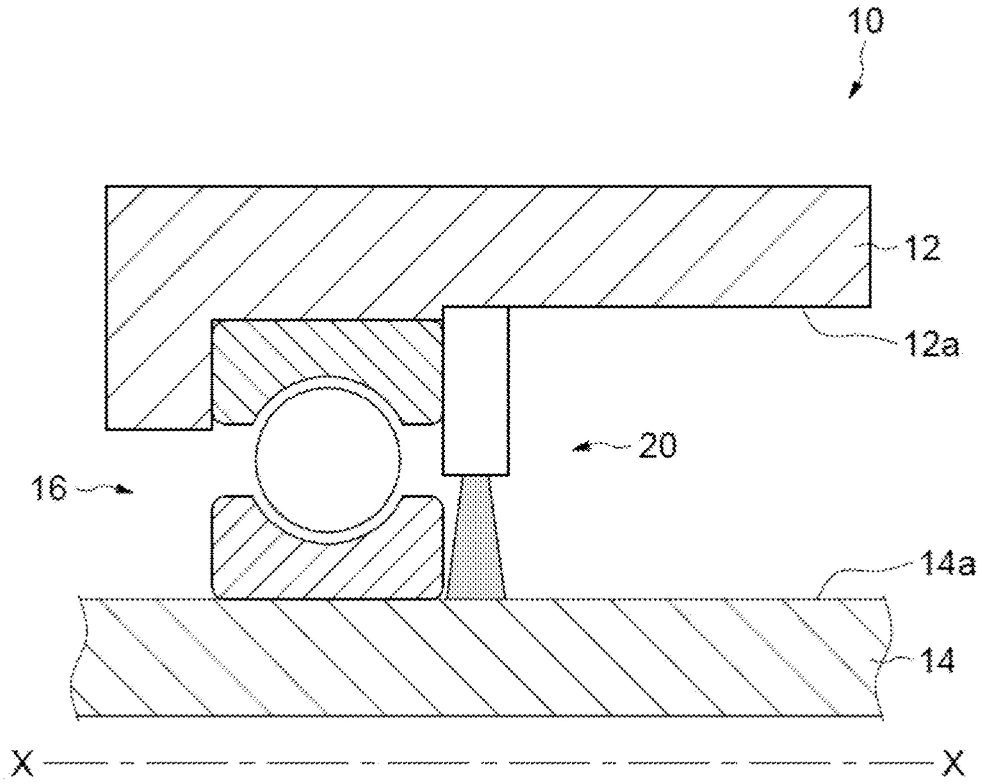
FIG. 1 is a view in axial section of a grounding brush assembly mounted radially between a rotary shaft and a housing of an electric motor.

FIG. 1 shows, in axial section, part of an electric motor 10 or machine comprising a fixed housing 12, a rotary shaft 14, of axis X-X, which is supported radially by a rolling bearing 16. The bearing 16 is mounted radially between the housing 12 and the rotary shaft 14. In this instance, the bearing 16 is of the ball bearing type. As an alternative, the bearing 16 may have any other type of rolling elements, such as cylindrical rollers, tapered rollers, etc., or may even be formed as a plain journal bearing.

The motor 10 further comprises a grounding brush assembly 20 which is mounted radially between the bore 12*a* of the housing 12 and the outer cylindrical surface 14*a* of the rotary shaft 14. The grounding brush assembly 20 serves to continuously dissipate any electrical charge that builds up on the shaft 14 of the motor 10 when the motor 10 is in operation, by transferring this charge to the housing 12.

A grounding brush assembly 20 according to an exemplary embodiment of the invention will now be described with reference to FIGS. 2-6.

The grounding brush assembly 20 preferably has an annular overall shape. The assembly 20 comprises a grounding brush 30 and a brush mounting plate 40 which is configured to radially center the brush 30 and to mount the assembly 20 within the housing 12.

As will be described in more detail below, the mounting plate 40 is also configured to establish and keep an axial space between the brush 30 and the bearing 16 or the housing 12.

The brush 30 includes a plurality of conductive individual fibers 31 which are intended to come around and surround the rotary shaft 14 of the motor 10. The conductive fibers 31 may be made from carbon, stainless steel, conductive plastics, such as fibers made from acrylic or nylon, or any other appropriate material.

The brush 30 further includes a holding or support member 32, inside of which the conductive fibers 31 are mounted or at least partially disposed. In the depicted exemplary embodiment, the support 32 is in the form of an open ring. The support 32 may be produced by cutting and pressing. The support 32 is preferably made from an electrically conductive material such as aluminum, stainless steel, bronze, copper or another appropriate material. Alternatively, the support 32 may be made from an electrically non-conductive material with a conductive coating or a conductive paint applied to the support 32.

Figure 5:
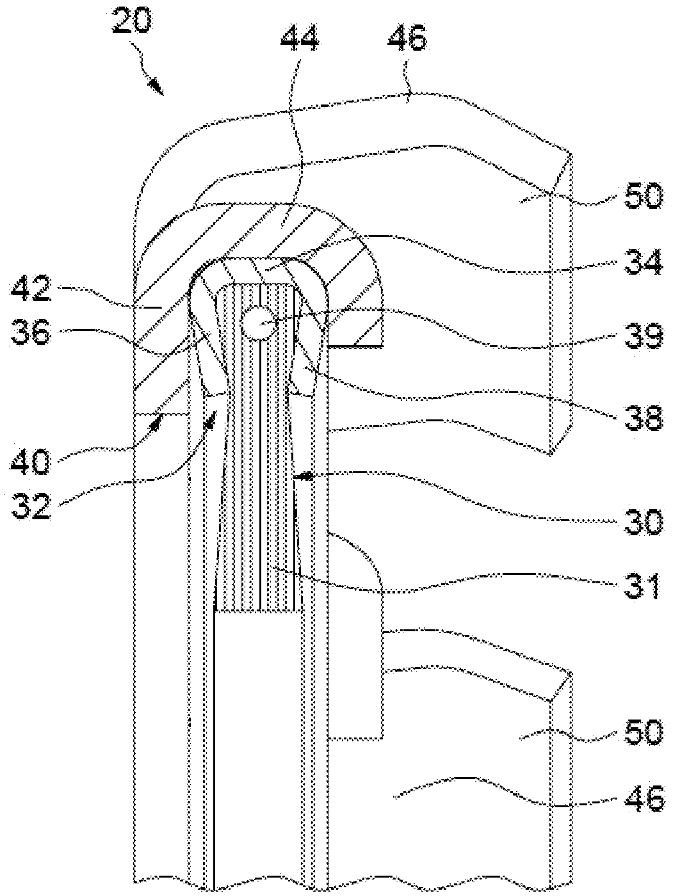
FIG. 5 is a sectional view along line V-V of FIG. 4.
Figure 6:
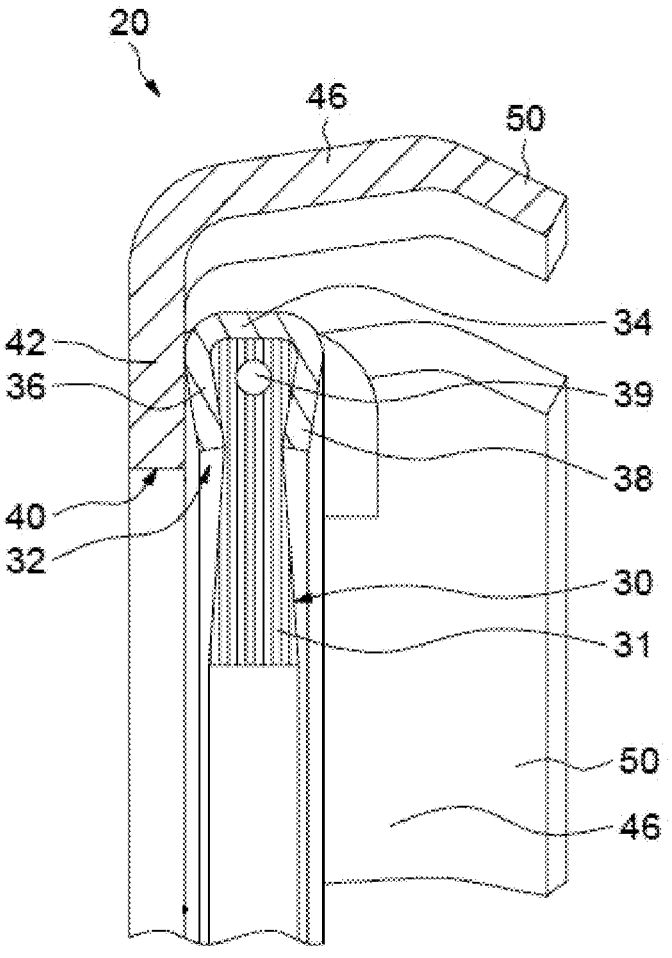
FIG. 6 is a sectional view along line VI-VI of FIG. 4.

As shown more clearly in FIGS. 5 and 6, the support 32 includes an axial mounting portion 34 and two opposite lateral flanks 36, 38 extending inwardly from the mounting portion 34 and axially gripping the conductive fibers 31. The conductive fibers 31 press axially on each side against the lateral flanks 36, 38. Specifically, the conductive fibers 31 press axially on each side against the internal faces of the lateral flanks 36, 38.

The mounting portion 34 and the two lateral flanks 36, 38 delimit a channel which is open radially on the inside and inside of which the conductive fibers 31 are partially positioned or partially disposed.

In the illustrated example, the conductive fibers 31 are bent around a connecting wire 39 of the support 32. The free distal end of each of the conductive fibers 31 is intended to come into radial contact with the outer surface of the rotary shaft 14 of the motor 10. The proximal end of the conductive fibers 31 is in radial contact with the mounting portion 34 of the support 32.

The lateral flank 36 extends from one axial end of the mounting portion 34 and the lateral flank 38 extends the opposite axial end of the portion 34. The lateral flanks 36, 38 extend obliquely inwardly from the mounting portion 34. The lateral flanks 36, 38 are symmetrical with each other about a radial midplane of the support 32. Preferably, the mounting portion 34 extends substantially axially, but may alternatively extend obliquely.

Figure 2:
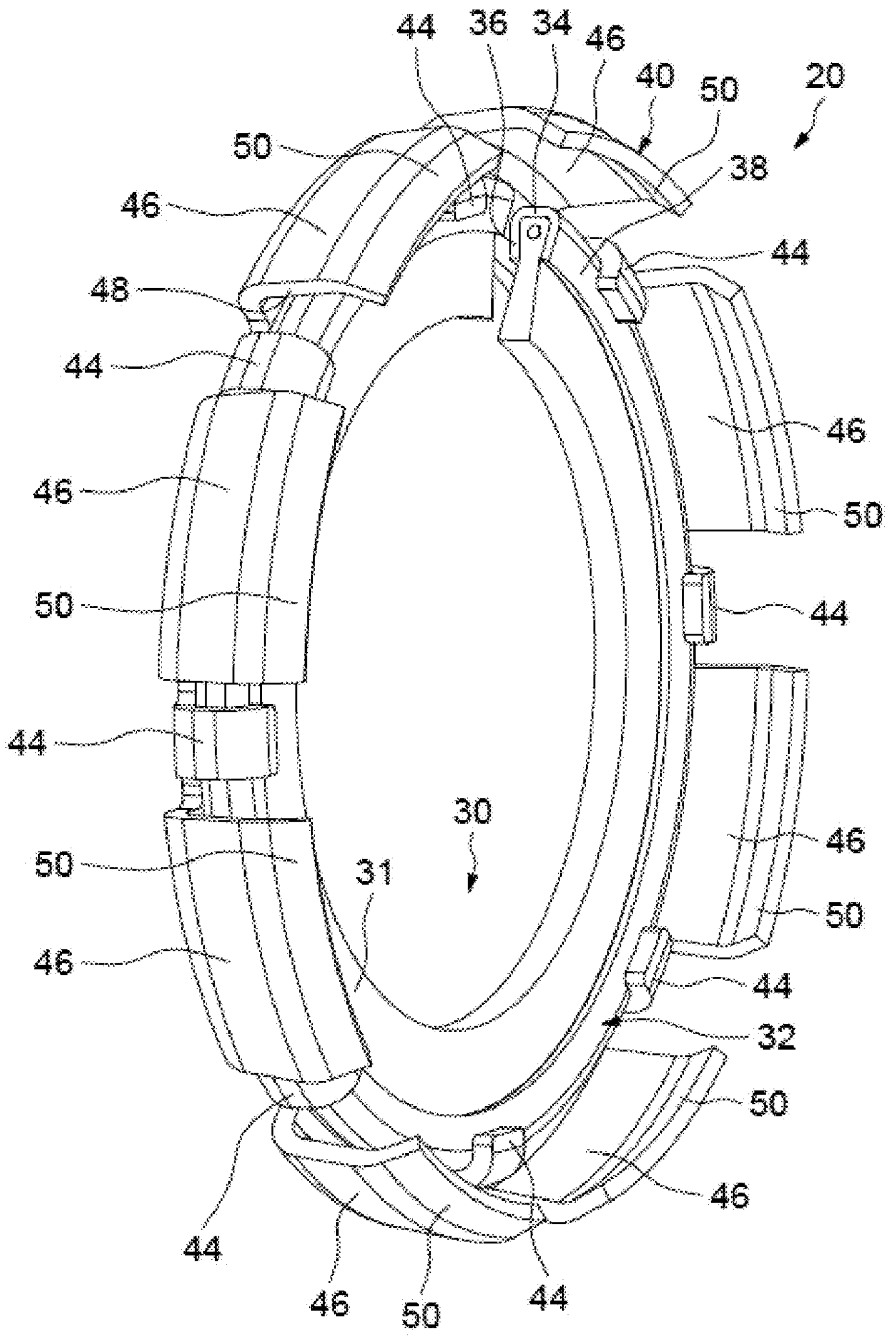
FIG. 2 is a front perspective view of a grounding brush assembly according to an exemplary embodiment of the invention.
Figure 3:
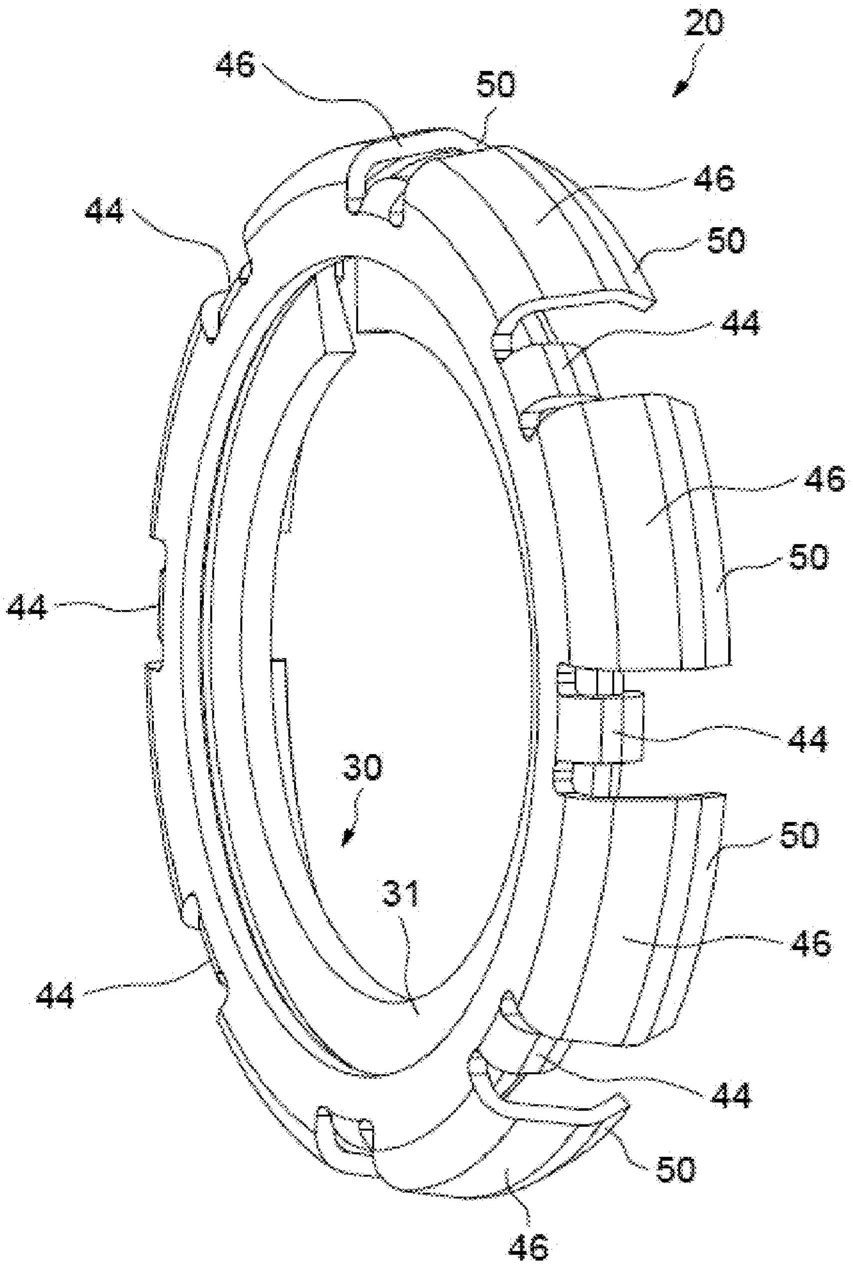
FIG. 3 is a rear perspective view of the grounding brush assembly according to the exemplary embodiment of the invention.

As stated above, the brush 30 is in the form of an open ring, as can be seen in particular in FIGS. 2 and 3. Such an open-ring structure allows the brush 30 to adapt to suit or fit about different diameters of motor shaft 14. In general, the circumferential ends of the brush 30 are not joined together. However, as a variant, it is possible to join or connect together these ends of the brush 30.

With reference to FIGS. 2, 5 and 6, the mounting plate 40 includes an annular radial portion 42 and a plurality of retention tongues 44 extending from the radial portion 42.

The radial portion 42 of the mounting plate 40 bears axially against the support 32 of the brush 30. More specifically, the radial portion 42 bears axially against the lateral flank 36 of the support 32.

The retention tongues 44 are spaced apart from each other in the circumferential direction, in this instance evenly or regularly. As an alternative, the tongues 44 may be irregularly circumferential spaced or staggered. In the depicted exemplary embodiment, the mounting plate 40 has eight retention tongues 44, but may alternatively have a greater or lesser number of tongues 44. For example, it possible to provide only two tongues 44 or at least four tongues 44. Preferably, the number of tongues 44 is at least equal to two.

Each retention tongue 44 protrudes axially with respect to the radial portion 42 of the mounting plate 40. Each tongue 44 locally radially surrounds the support 32 of the brush 30 and is in radial contact with the mounting portion 34 of the support 32. The support 32 is held axially bearing against the radial portion 42 of the mounting plate 40 by the retention tongues 44. The tongues 44 function to axially and radially retain the grounding brush 30 to the mounting plate 40. As such, the lateral flank 36 of the support 32 bears against the radial portion 42 of the mounting plate 40 and the lateral flank 38 bears against the tongues 44. Preferably, the tongues 44 are substantially identical to each other.

As shown more clearly in FIG. 5, each tongue 44 is provided with an axial portion, the axial portion extending axially from the radial portion 42 of the mounting plate 40, locally radially surrounding the support 32 and in radial contact with the support 32, and with a bent-over portion at the free end of the axial portion. The bent-over portion of each tongue 44 serves for axially retaining the support 32 of the grounding brush 30. The bent-over portion of each tongue 44 is in axial contact against the lateral flank 38 of the support 32.

The mounting plate 40 of the grounding brush assembly 20 also includes a plurality of centering tabs 46 extending from the radial portion 42 and spaced apart from each other in the circumferential direction. A cutout 48 (FIG. 2) is formed on the radial portion 42 between each pair of immediately successive or adjacent tabs 46. Preferably, the tabs 46 are formed by cutting and bending the radial portion 42.

Each centering tab 46 extends axially from the radial portion 42. Specifically, the tabs 46 each extend obliquely from a large-diameter edge of the radial portion 42. Preferably, the tabs 46 each extend axially from the same side of the plate 40 as the retention tongues 44, and the tabs 46 project axially with respect to the tongues 44. Alternatively, the tabs 46 may extend axially from a side opposite the tongues 44.

Each centering tab 46 locally radially surrounds the support 32 of the brush 30 while remaining separated therefrom. The tabs 46 are partially offset radially outwardly with respect to the tongues 44. Preferably, the tabs 46 are formed substantially identical to each other. The tabs 46 collectively define the outside diameter of the mounting plate 40. Each tab 46 preferably extends obliquely, but may alternatively extend substantially axially. Each tab 46 is in the form of a portion of a cylinder, with the bore in each tab 46 is radially spaced apart from the support 32 by a non-zero radial distance. The outer surfaces of the tabs 46 collectively define the outside diameter of the mounting plate 40. The centering tabs 46 function to center the mounting plate 40 once it has been mounted in the bore 12*a* of the housing 12 of the associated electric motor 10, and the tabs 46 engage with the inner circumferential surface defining the bore 12*a*.

Figure 4:
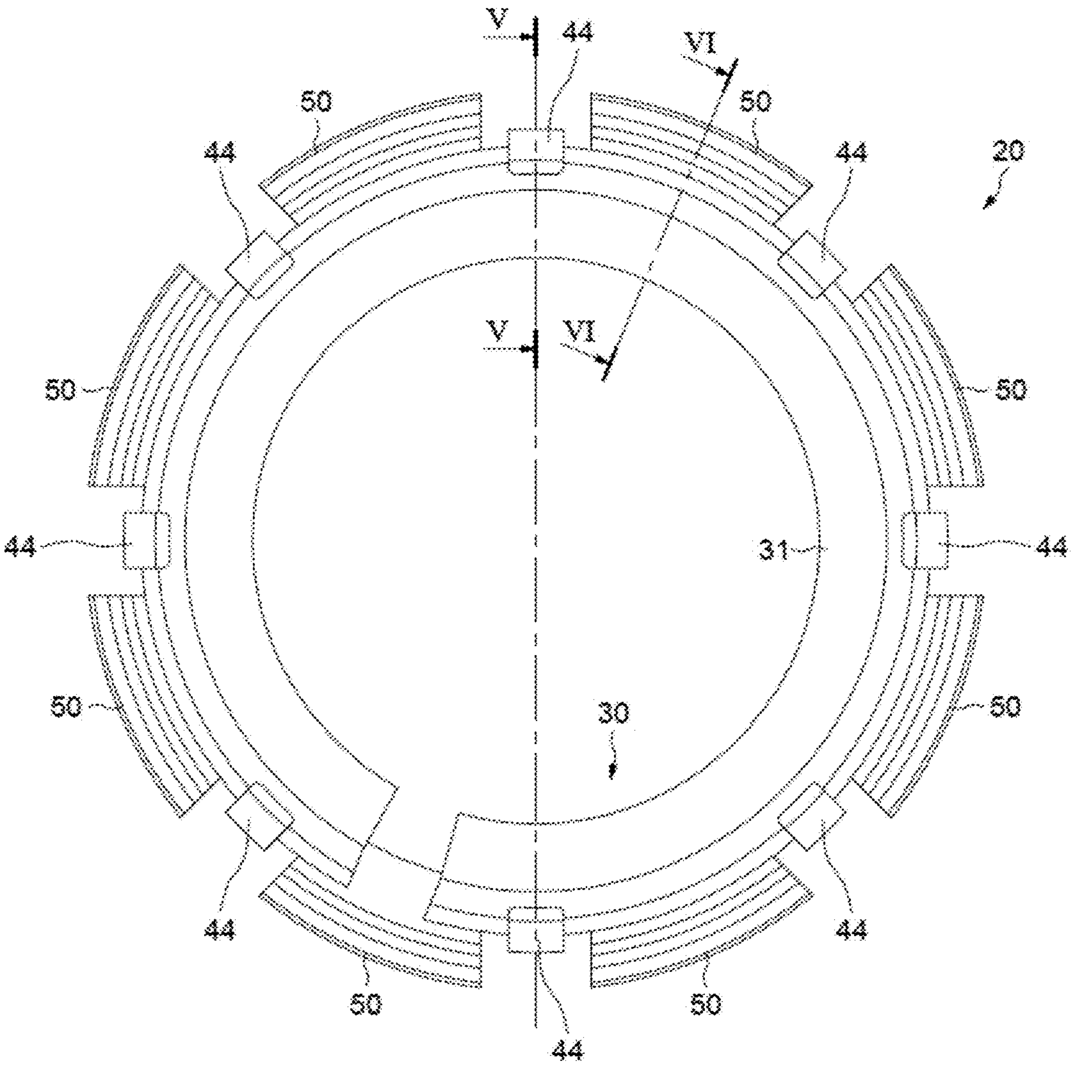
FIG. 4 is a front plan view of the grounding brush assembly of FIGS. 2 and 3.

As illustrated in FIGS. 2 and 4, the centering tabs 46 are spaced apart from each other in the circumferential direction, in this instance evenly. As an alternative, the tabs 46 may be irregularly circumferentially spaced apart or staggered. Each tab 46 is positioned in the circumferential direction between two immediately successive tongues 44. In other words, each centering tab 46 is spaced apart in the circumferential direction from the two immediately adjacent retention tongues 44. In this instance, each tab 46 has a circumferential dimension greater than a circumferential dimension of each of the tongues 44.

As stated above, the mounting plate 40 is also configured to establish and keep an axial space between the brush 30 and the bearing 16 or the housing 12.

For this purpose, the mounting plate 40 further includes a plurality of spacer portions 50 each extending obliquely inwardly from a separate one of the tabs 46. In the exemplary embodiment, every one of the centering tabs 46 is extended by a spacer portion 50. Alternatively, only some tabs 46 might be extended by the spacer portions 50.

The spacer portions 50 are spaced apart from each other in the circumferential direction. As with the centering tabs 46, the spacer portions 50 are formed by cutting and bending the radial portion 42 of the mounting plate 40. Each spacer portion 50 is in the form of a portion of a cylinder. Preferably, the spacer portions 50 are formed substantially identical to each other.

Each spacer portion 50 extends obliquely inwardly from the associated centering tab 46. Each spacer portion 50 extends from the associated tab 46 on the side opposite to the radial portion 42 of the mounting plate 40 and the support 32. Each spacer portion 50 is offset axially with respect to the retention tongues 44 on the side opposite to the radial portion 42 of the mounting plate 40; i.e., the retention tongues 44 are disposed axially between the spacer portions 50 and the radial portion 42. Preferably, each spacer portion 50 has a circumferential dimension which is equal to a circumferential dimension of the associated tab 46. As an alternative, the spacer portions 50 may be formed having a circumferential dimension that is less than a circumferential dimension of the tabs 46.

Each spacer portion 50 extends from the large diameter of the associated centering tab 46. Preferably, each spacer portion 50 is offset radially outwardly with respect to the mounting portion 34 of the support 32 of the brush 30. As an alternative, the spacer portions 50 may be offset radially inwardly with respect to the mounting portion 34 of the support 32.

The mounting plate 40 is produced by cutting and pressing. The mounting plate 40 is made from a conductive material such as aluminum, stainless steel, bronze, copper or another appropriate material. Alternatively, the mounting plate 40 may be made from an electrically non-conductive material with a conductive coating or a conductive paint applied to the plate 40. Preferably, the mounting plate 40 is made as a single piece.

While the electric machine 10 is in operation, the electric charge that builds up on the shaft 14 is dissipated to the housing 12 through the conductive fibers 31, the support 32 of the brush 30, and the mounting plate 40 of the grounding brush assembly 20.

The grounding brush assembly 20 is mounted such that the spacer portions 50 of the mounting plate are situated or located axially on the side of the bearing 16. By virtue of the spacer portions 50, contact between the conductive fibers 31 of the brush 30 and the bearing 16 is prevented.

In the exemplary embodiment illustrated, the mounting plate 40 of the grounding brush assembly 20 comprises a plurality of centering tabs 46. Alternatively, the tabs 46 may be replaced by an annular flange forming an annular centering portion.

With such a design, the mounting plate 40 may comprise a single annular spacer portion, a single spacer portion extending over an angular sector of less than 360°, or else a plurality of spacer portions spaced apart from one another in the circumferential direction.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A grounding brush assembly comprising:

a grounding brush including a support and a plurality of conductive fibers disposed at least partially within the support; and a brush mounting plate secured to the support of the brush, the mounting plate including a radial portion, at least one centering portion extending at least axially from the radial portion, the at least one centering portion being offset radially outwardly with respect to and axially overlapping the support of the brush and having an outer surface defining the outside diameter of the mounting plate, the at least one centering portion being engageable with an inner circumferential surface of the housing bore so as to center the mounting plate, and at least one spacer portion extending obliquely inwardly from an axial end of the at least one centering portion on the side of the centering portion opposite to the radial portion and configured to establish and maintain an axial space between the brush and a bearing or a housing on the axial side of the mounting plate on which the brush is secured.

2. The assembly according to claim 1, wherein the mounting plate includes a plurality of retention tongues extending from the radial portion and configured to retain the support of the brush, the at least one centering portion being offset radially outwardly with respect to the retention tongues.

3. The assembly according to claim 2, wherein the at least one spacer portion of the mounting plate is offset axially with respect to the retention tongues on the side opposite to the radial portion of the mounting plate.

4. The assembly according to claim 1, wherein the mounting plate includes a plurality of the centering portions spaced apart in the circumferential direction and a plurality of the spacer portions, each spacer portion extending obliquely inwardly from a separate one of the centering portions.

5. The assembly according to claim 1, wherein the mounting plate includes an annular centering portion.

6. The assembly according to claim 1, wherein the brush is mounted axially against the radial portion of the mounting plate.

7. The assembly according to claim 1, wherein the mounting plate is made as a single piece.

8. An electric motor comprising:

a housing;

a shaft;

at least one bearing mounted radially between the housing and the shaft; and at least one grounding brush assembly according to claim 1 mounted radially between the housing and the shaft, the conductive fibers of the brush of the assembly being in contact with the shaft and the spacer portion of the mounting plate being located axially on the side of the bearing.

* * * * *